Feb. 28, 1950 — E. W. JOHNSON — 2,499,316
MAGNETIC MOTOR FOR VISUAL INDICATOR UNITS
Filed Jan. 20, 1948 — 2 Sheets-Sheet 1
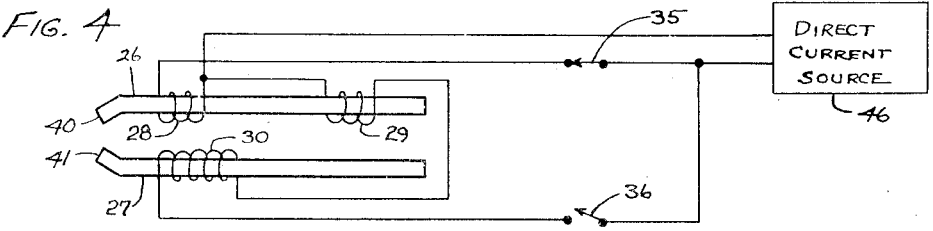
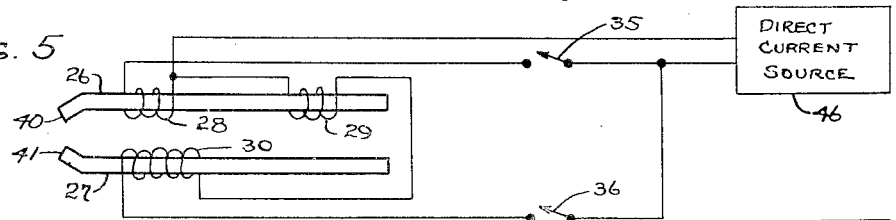
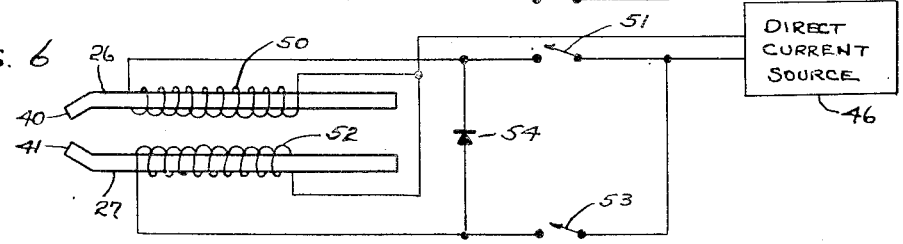
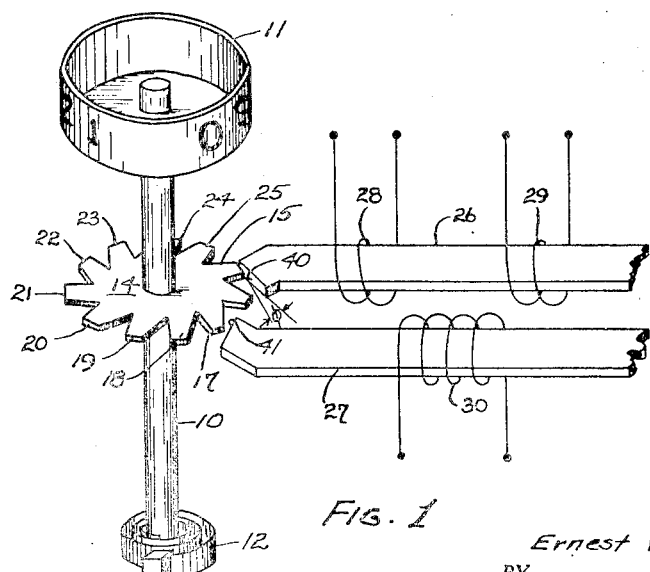
INVENTOR.
Ernest W. Johnson
BY Robert T. Palmer
Attorney INVENTOR.
Ernest W. Johnson
BY Robert T. Palmer
Attorney Patented Feb. 28, 1950

2,499,316

UNITED STATES PATENT OFFICE 2,499,316

MAGNETIC MOTOR FOR VISUAL INDICATOR UNITS

Ernest W. Johnson, Everett, Mass., assignor to Transducer Corporation, South Boston, Mass.

Application January 20, 1948, Serial No. 3,311

4 Claims. (Cl. 172—36)

This invention relates to visual indicator units which may be electrically operated so as to display numerals or other data at remote points.

Electrically operated visual indicator units are used to display numbers in such duties as train-announcing systems and price-quotation systems. The conventional units of this type are operated by stepping relays, which are relatively slow in operation and are relatively noisy, and have relatively high manufacturing costs.

Objects of this invention are to increase the speed of operation of visual indicator units; to lessen their noise of operation; and to decrease their costs of manufacture.

The invention will now be described with reference to the drawing, of which:

Fig. 1 is a projected view, partially diagrammatic, of visual indicator unit embodying this invention;

Fig. 4 is a schematic of an electrical circuit which may be used to operate the units of Figs. 1, 2, and 3;

Fig. 5 is a schematic of another electrical circuit which may be used to operate the units; and Fig. 6 is a schematic of still another circuit which may be used to operate the units.

Figure 3:
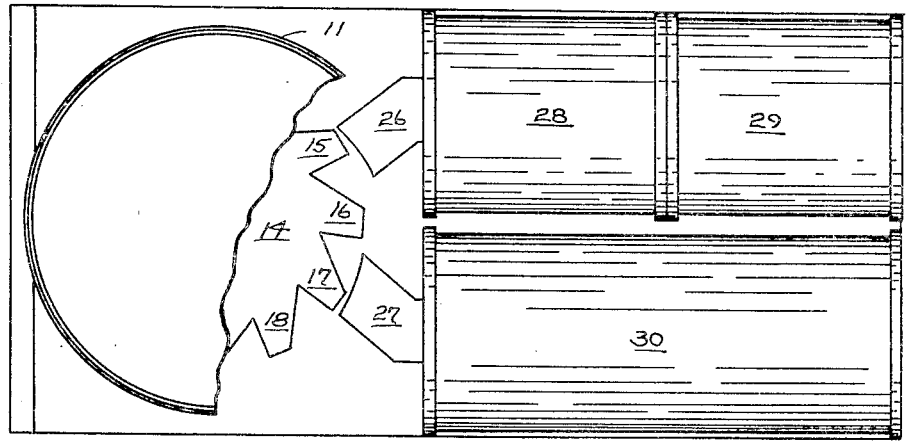
Fig. 3 is a plan view, with a portion removed, of the unit of Fig. 2.

Referring first to Fig. 1, the rotary shaft 10 has secured to its upper end the indicating drum 11 having spaced numerals printed on the exterior thereof. The spiral re-set spring 12 is attached to the lower end of the shaft 10. The toothed wheel 14 of soft iron extends around the shaft 10, intermediate its ends, and is attached to the shaft so as to rotate same. The wheel 14 has the teeth 15, 16, 17, 18, 19, 20, 21, 22, 23, and 24 formed thereon. The bars 26 and 27 of soft iron have their inner ends spaced closely from the path traversed by the outer faces of the teeth, and are spaced apart so as to overlap three teeth. The outer tips 40 and 41 of the bars 26 and 27 respectively, adjacent to teeth are beveled so as to form the angles Φ to the faces of the teeth when the teeth are lined up with the nearest portions of the bar tips, as illustrated by Fig. 1 by the lining up of the tooth 15 with the tip 40. The bar 26 has the coils 28 and 29 therearound, and the bar 27 has the coil 30 therearound.

The coils 28, 29, and 30 may be connected in the circuit illustrated by Fig. 4 for operating the unit, the coil 28 being connected through the switch 35 to the direct current electric source 46, and the coils 29 and 30 being connected in series and through the switch 36 to the electric source 46. The switch 35 is normally closed whereby the coil 28 is continuously energized. The switch 36 is closed and opened for advancing the wheel 14 of the unit.

Since the coil 28 is continuously energized, the tip 40 of the bar 26 is made a magnetic pole and attracts the nearest tooth 15 (Figs. 1 and 3). Since the pole tip 40 is beveled at the angle Φ to the tooth face, the tooth 15 seeking the path of minimum magnetic reluctance will move in a counter-clockwise direction (facing Fig. 1 of the drawing) to the closest end of the pole tip, as illustrated best by Fig. 1. This will bring, as illustrated by Fig. 1, the tooth 17 to a position facing the portion of the tip 41 of the bar 27 most remote from the tip 41 which is beveled similarly to the beveling of the tip 40 of the bar 26.

In order to step the wheel 14 one tooth forward, the switch 36 (Fig. 4) is closed causing the coils 29 and 30 to be connected to the electric source 46. At this time, two actions take place. The coil 29 is energized to cancel the magnetic force set up in the bar 26 by the coil 28. At the same time, the coil 30 is energized and causes the bar 27 to be magnetized, the pole tip 41 of which then acts on the tooth 17 to cause it to move to the closest end of the pole tip 41, to a position corresponding to that of the tooth 15 relative pole tip 40, as illustrated by Fig. 1. This movement results in the wheel being moved in a counter-clockwise direction through an angle equal to one-half the tooth spacing. This results in the tooth 16 being moved to a position in which its outer face is lined up with the most remote portion, due to its taper, of the pole tip 40.

When the switch 36 is opened, the bar 26 again becomes magnetized and its pole tip 40 attracts the tooth 16 and causes it to move the wheel 14 through an angle equal to one-half the tooth spacing into the position occupied by the tooth 15 at the start of the cycle. One closing and opening of the switch 36 thus causes the wheel 14 and the associated drum 11 to be advanced one tooth space. Thus, it may be seen that a series of direct current pulses through the coils 29 and 30, as caused by the closing and opening of the switch 36, will move the wheel 14 an equal number of teeth. The drum 11 may be marked so that a first pulse will cause the numeral "1" to be displayed, a second pulse will cause the numeral "2" to be displayed, and so on.

During the stepping of the wheel 14, as described in the foregoing, the spring 12 tends to return the wheel 14 to its starting position, the position illustrated by Fig. 1. The energization of the coil 28 through the switch 35 being closed prevents this. When the switch 35 is opened so that the coil 28 is de-energized, the bar 26 is then de-magnetized and the spring 12 then returns the wheel to its starting position. The switch 36 would be open at this time.

Fig. 5 illustrates a modification of the control circuit in which the bar 26 is a permanent magnet. The coil 28 in this embodiment is used to cancel the holding force of the pole tip 40 when it is energized by the closing of the switch 35. The stepping operation is the same as that described in the foregoing in connection with Fig. 4. When it is desired to return the wheel 14 to its starting position, the switch 35 is closed, the magnetizing action of the pole tip 40 is canceled, and the spring 12 returns the wheel to its starting position.

Fig. 6 illustrates a modification of the control circuit in which the bar 26 is a permanent magnet and has a single coil 50 wound thereon which is connected through the switch 51 to the electric source 46. The bar 27 of soft iron has the single coil 52 thereon which is connected through the switch 53 to the battery 46. The rectifier 54, which may be a selenium or copper oxide rectifier is connected to the coils 50 and 52 between same and the switches 51 and 53 so that during the stepping operation, when the switch 53 is closed, the rectifier passes current to the coil 50 so as to energize it for canceling the magnetic force of the pole tip 40. At the same time, the coil 52 is energized to magnetize the pole tip 41 for advancing the wheel 14.

The switch 51 is closed to re-set the wheel 14 to its starting position, and energizes the coil 50 for canceling the magnetic force at the pole tip 40. The rectifier 54, at this time, will not pass current to the coil 52, which remains de-energized, the switch 53 being open at this time.

The embodiments of the invention, illustrated by Figs. 5 and 6, are preferable to that illustrated by Fig. 4 since the use of permanent magnets for the bars 26 will prevent re-setting of the wheel 14 to its starting position in case of power failure.

Figure 2:
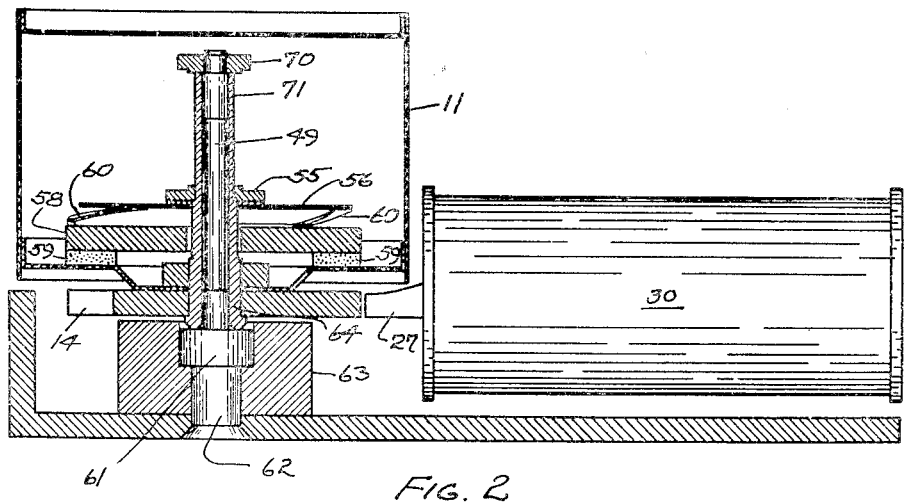
Fig. 2 is a side elevation, partially in section, of a commercial form of visual indicator unit embodying this invention.

Figs. 2 and 3 illustrate a commercial embodiment of the invention. The shaft 49 in this embodiment does not rotate and has the enlarged lower portions 61 and 62 which are anchored in the base support 63. The bearing 64 extends around the shaft 49 above the shaft portion 61, and the toothed wheel 14, the drum 11, the collar 55, and the damper spring 56 are attached to the bearing for rotation therewith around the shaft 49.

The damper 58 is supported from the lower wall of the drum 11 by the felt washer 59. The damper spring 56 has the tongues 60 which press against the damper 58. The damper acts to restrain overshooting of the wheel 14 when it is being stepped around. The upper end of the shaft 49 has the collar 70 attached thereto, and the sleeve 71 extends between the collars 55 and 70. A spiral spring, which is not illustrated because of the small diameters of its turns, extends around the sleeve 71 and has one end attached to the collar 55 and its other end attached to the collar 70. This spring rotates the collar 55 and through it the bearing 54 and the drum and toothed wheel carried by the bearing when the control circuit is actuated to re-set the tooth wheel to its starting position.

While embodiments of the invention have been described for the purpose of illustration, it should be understood that the invention is not limited to the exact apparatus and the arrangement of apparatus illustrated since modifications thereof may be suggested by those skilled in the art, without departure, from the essence of the invention.

What is claimed is:

1. A visual indicator unit comprising a support; a toothed wheel of magnetizable metal supported for rotation on said support; a pair of spaced bars of magnetizable metal having pole tips adjacent to the teeth of said wheel, one of said bars being normally magnetized during the operation of said unit; a coil on the other of said bars; means for supplying direct current pulses through said coil for advancing said wheel toward said one bar; and means including a spring connected to said wheel so as to oppose rotation thereof, and including means for demagnetizing said one bar, for restoring said wheel to its starting position.

2. A visual indicator unit comprising a support; a toothed wheel of magnetizable metal supported for rotation on said support; a pair of spaced bars having pole tips adjacent to the teeth of said wheel, one of said bars being a permanent magnet and the other of said bars being of easily magnetizable metal; coils on said bars, means for supplying direct current pulses through the coil on the other of said bars for advancing said wheel towards said one bar; a spring connected to said wheel so as to oppose rotation thereof; and means for supplying direct current through the coil on said one bar so as to demagnetize same, whereby said spring can restore said wheel to its starting position.

3. A visual indicator unit comprising a support; a toothed wheel of easily magnetizable metal supported for rotation on said support; a pair of spaced bars having pole tips adjacent the tips of the teeth on said wheel, the pole tips at corresponding ends being closely spaced from the space swept by the tips of the teeth and tapering towards their other ends away from said space, one of said bars being normally magnetized during the operation of the unit, whereby a tooth overlapped by its pole tip will move towards the nearest end thereof; a coil on the other of said bars; means for supplying direct current pulses through said coil for causing a tooth overlapped by the pole tip of the other of said bars to move toward the nearest end thereof for advancing said wheel; and means including a spring connected to said wheel so as to oppose rotation thereof, and including means for deenergizing said one bar, for restoring said wheel to its starting position.

4. A visual indicator unit comprising a support; a toothed wheel of easily magnetizable metal supported for rotation on said support; a pair of spaced bars having pole tips adjacent the tips of the teeth on said wheel, the pole tips at corresponding ends being closely spaced from the space swept by the tips of the teeth and tapering towards their other ends away from said space, one of said bars being a permanent magnet, whereby a toothed overlapped by its pole tip will move towards the nearest end thereof; coils on said bars; means for supplying direct current pulses through the coil on the other of said bars for causing a tooth overlapped by its pole tip to move towards the nearest end of same for advancing said wheel; and means including a spring connected to said wheel so as to oppose rotation thereof, and including means for supplying direct current through the coil on said one bar so as to demagnetize same, for restoring said wheel to its starting position.

ERNEST W. JOHNSON.

REFERENCES CITED

The following references are of record in the file of this patent:

UNITED STATES PATENTS

| Number | Name | Date |
|---|---|---|
| 513,725 | Perret | Jan. 30, 1894 |
| 1,787,620 | Favarger | Jan. 6, 1931 |